United States Patent
Zhang

(10) Patent No.: US 10,361,829 B2
(45) Date of Patent: Jul. 23, 2019

(54) DATA TRANSMISSION METHOD AND DEVICE

(71) Applicant: Huawei Technologies Co., Ltd., Shenzhen (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 74 days.

(21) Appl. No.: 15/523,248

(22) PCT Filed: Oct. 28, 2014

(86) PCT No.: PCT/CN2014/089633
§ 371 (c)(1),
(2) Date: Apr. 28, 2017

(87) PCT Pub. No.: WO2016/065527
PCT Pub. Date: May 6, 2016

(65) Prior Publication Data
US 2017/0331603 A1    Nov. 16, 2017

(51) Int. Cl.
*H04L 12/58* (2006.01)
*H04L 5/00* (2006.01)
(Continued)

(52) U.S. Cl.
CPC ......... *H04L 5/0048* (2013.01); *H04W 72/042* (2013.01); *H04W 72/0406* (2013.01);
(Continued)

(58) Field of Classification Search
None
See application file for complete search history.

(56) References Cited

U.S. PATENT DOCUMENTS

2007/0026813 A1*  2/2007  Khan ............... H04L 1/0026
455/69
2007/0218948 A1   9/2007  Kurokawa
(Continued)

FOREIGN PATENT DOCUMENTS

CN    101039237 A    9/2007
CN    103458435 A   12/2013

OTHER PUBLICATIONS

"Draft Standard for Information technology Telecommunications and information exchange between systems Local and metropolitan area networks Specific requirements," Part 11: Wireless LAN Medium Access Control (MAC) and Physical Layer (PHY) Specifications; LAN/MAN Standards Committee of the IEEE Computer Society; Aug. 2016; 3775 pages.
(Continued)

*Primary Examiner* — Zewdu A Beyen
(74) *Attorney, Agent, or Firm* — Slater Matsil, LLP

(57) ABSTRACT

Embodiments relate to a data transmission method and device. A feedback request is sent by a first device to user equipment that instructs the user equipment to feed back channel indication data to a network device. The channel indication data indicates that a channel is occupied by the first device within a time that corresponds to the channel indication data. The network device includes the first device and one additional device. The first device receives the channel indication data sent by the UE. The first device performs data transmission with the UE using the channel within the time that corresponds to the channel indication data.

17 Claims, 7 Drawing Sheets

(51) Int. Cl.
*H04W 72/04* (2009.01)
*H04W 72/08* (2009.01)
H04W 74/08 (2009.01)
H04W 88/02 (2009.01)

(52) U.S. Cl.
CPC ..... *H04W 72/0446* (2013.01); *H04W 72/085* (2013.01); *H04W 72/08* (2013.01); *H04W 74/0816* (2013.01); *H04W 88/02* (2013.01)

(56) References Cited

U.S. PATENT DOCUMENTS

2008/0112351 A1    5/2008  Surineni et al.
2010/0298006 A1*  11/2010  Ko ......................... H04B 7/022
                                                    455/452.2
2014/0308965 A1   10/2014  Benveniste

OTHER PUBLICATIONS

"Hidden node problem and potential solutions for LAA," Alcatel-Lucent Shanghai Bell, Alcatel-Lucent; 3GPP TSG RAN WG1 Meeting #78bis; R1-144084; 7.3.2.3; Oct. 6-10, 2014; 4 pages; Ljubljana, Slovenia.
"Design targets for LAA using LTE," Hitachi Ltd.; 3GPP TSG RAN WG1 Meeting #78bis; R1-144221; 7.3.2.2; Oct. 6-10, 2014; 4 pages; Ljubljana, Slovenia.
"Measurements in support of various LTE-A Techniques," Qualcomm Europe; 3GPP TSG-RAN WG1 #58; R1-093137; 15.8; Aug. 24-28, 2009; 3 pages; Shenzhen, China.

* cited by examiner

DATA TRANSMISSION METHOD AND DEVICE

CROSS-REFERENCE TO RELATED APPLICATIONS

This application claims the benefit of U.S. Provisional Application No. PCT/CN2014/089633, filed on Oct. 28, 2014, which application is hereby incorporated herein by reference.

TECHNICAL FIELD

The present invention relates to the communications field, and in particular, to a data transmission method and a device.

BACKGROUND

In the field of communications technologies, user equipment (UE) frequently needs to perform data transmission with a network device. For example, the UE performs data transmission with a base station or an access point (AP). In actual applications, different base stations or APs are deployed at different locations. However, coverage areas of two base stations may have an intersection area, or coverage areas of a base station and an AP may have an intersection area. In this case, when the UE is located in the area, the base station may fail to effectively sense existence of another device (such as a WiFi AP or a base station) nearby. Consequently, a hidden terminal problem (HTP) may be caused.

For example, when the UE is located indoors, because a penetration loss of a signal is relatively high, an outdoor base station may not detect a signal transmitted by an indoor WiF AP. The base station communicates with the UE. However, the base station is relatively close to the WiFi AP, and therefore, a downlink signal transmitted by the WiFi AP interferes with communication between the base station and the UE, affecting communication between an LTE base station and the UE.

In conclusion, when a network device fails to effectively sense another network device, and communicates with UE by using a communications channel (for example, a communications spectrum) that can be used by multiple network devices, the communication between the network device and the UE may be interfered with by the another network device. In this way, an HTP is caused. That is, the UE suffers interference jitter.

In addition, in the foregoing technology, because the network device may fail to effectively sense the another network device, the UE may be caused to suffer multiple HTPs during receiving of data. In this case, the HTP may be defined as an interference jitter phenomenon. In this way, the interference jitter phenomenon is a problem to be resolved urgently in the current communications field.

SUMMARY

The present invention provides a data transmission method and a device, so that UE can be prevented from suffering an interference jitter phenomenon.

According to a first aspect, the present invention provides a data transmission method. The method includes sending, by a first device to user equipment (UE), a feedback request that is used to instruct to feed back channel indication data to a network device. The channel indication data is used to indicate that a channel is occupied by the first device within a time that corresponds to the channel indication data. The network device includes at least the first device. The method also includes receiving, by the first device, the channel indication data sent by the UE. The method further includes performing, by the first device within the time that corresponds to the channel indication data, data transmission with the UE by using the channel.

In a first possible implementation manner of the first aspect, before the sending, by a first device to UE, a feedback request that is used to instruct to feed back channel indication data to a network device, the method further includes: determining, by the first device, whether the UE is suspected UE, and if yes, performing the step of sending, by a first device to user equipment (UE), a feedback request that is used to instruct to feed back channel indication data to a network device, where the suspected UE includes UE that possibly suffers a hidden terminal problem (HTP).

With reference to the first possible implementation manner of the first aspect, in a second possible implementation manner of the first aspect, that the first device determines whether the UE suffers the HTP includes: receiving, by the first device, signal information of first cell and signal information of second cell that are uploaded by the UE, where the signal information of first cell is cell signal information that is obtained by the UE by monitoring on the first device, and the second signal information is cell signal information that is obtained by the UE by monitoring on a second device included in the network device; and determining, by the first device, whether a difference between the signal information of first cell and the signal information of second cell is less than or equal to a preset threshold; and if yes, determining that the UE is suspected UE, or if not, determining that the UE is not suspected UE.

With reference to the first possible implementation manner of the first aspect or the second possible implementation manner of the first aspect, in a third possible implementation manner of the first aspect, the receiving, by the first device, the channel indication data sent by the UE includes: before the first device transmits data to the UE, receiving, by the first device, the channel indication data sent by the UE.

With reference to the first aspect, in a fourth possible implementation manner of the first aspect, the method further includes: receiving, by the first device, a notification message that is sent by the UE and is used to indicate that the UE is suffering an HTP; and the sending, by a first device to UE, a feedback request that is used to instruct to feed back channel indication data to a network device includes: sending, by the first device to the UE according to the notification message, the feedback request that is used to instruct to feed back the channel indication data to the network device.

With reference to any one of the foregoing implementation manners of the first aspect, in a fifth possible implementation manner of the first aspect, the channel indication data includes a preset sounding reference signal (SRS), where the SRS includes a preset SRS pattern, or the SRS includes a combination of multiple SRS patterns.

With reference to the fifth possible implementation manner of the first aspect, in a sixth possible implementation manner of the first aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the fifth possible implementation manner of the first aspect or the sixth possible implementation manner of the first aspect, in a seventh possible implementation manner of the first aspect, the receiving, by the first device, the channel indication data sent by the UE includes: receiving, by the first device in an uplink subframe, the SRS sent by the UE; or receiving, by the first device in a downlink subframe, the SRS sent by the UE, where the downlink subframe is further used to transmit downlink data, and a location occupied by the SRS in the downlink subframe is configured by the first device.

According to a second aspect, the present invention provides a data transmission method. The method includes receiving, by UE, a feedback request that is sent by a first device and is used to instruct to feed back channel indication data to a network device The channel indication data is used to indicate that a channel is occupied by the first device within a time that corresponds to the channel indication data. The network device includes at least the first device. The method also includes sending, by the UE, the channel indication data to the network device. The method further includes performing, by the UE within the time that corresponds to the channel indication data, data transmission with the first device by using the channel.

In a first possible implementation manner of the second aspect, before the receiving, by UE, a feedback request that is sent by a first device and is used to instruct to feed back channel indication data to a network device, the method further includes: sending, by the UE, signal information of first cell and signal information of second cell to the first device, where the signal information of first cell is cell signal information that is obtained by monitoring on the first device, and the second signal information is cell signal information that is obtained by monitoring on a second device included in the network device, so that the first device sends the feedback request when the first device determines that a difference between the signal information of first cell and the signal information of second cell is less than or equal to a preset threshold.

With reference to the first possible implementation manner of the second aspect, in a second possible implementation manner of the second aspect, the sending, by the UE, the channel indication data to the network device includes: before the UE transmits data to the first device, sending, by the UE, the channel indication data to the network device.

With reference to the second aspect, in a third possible implementation manner of the second aspect, before the receiving, by UE, a feedback request that is sent by a first device and is used to instruct to feed back channel indication data to a network device, the method further includes: sending, by the UE to the first device, a notification message that is used to indicate that the UE is suffering an HTP, so that the first device sends the feedback request according to the notification message.

With reference to any one of the foregoing implementation manners of the second aspect, in a fourth possible implementation manner of the second aspect, the channel indication data includes a preset sounding reference signal (SRS), where the SRS includes a preset SRS pattern, or the SRS includes a combination of multiple SRS patterns.

With reference to the fourth possible implementation manner of the second aspect, in a fifth possible implementation manner of the second aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the fourth possible implementation manner of the second aspect or the fifth possible implementation manner of the second aspect, in a sixth possible implementation manner of the second aspect, the sending, by the UE, the channel indication data to the network device includes: sending, by the UE in an uplink subframe, the SRS to the network device; or sending, by the UE in a downlink subframe, the SRS to the network device, where the downlink subframe is further used to transmit downlink data, and a location occupied by the SRS in the downlink subframe is configured by the first device.

According to a third aspect, the present invention provides a data transmission method. The method includes receiving, by a second device, channel indication data sent by user equipment (UE). The channel indication data is used to indicate that a channel is occupied by a first device within a time that corresponds to the channel indication data. The network device includes at least the second device and the first device. The first device instructs the UE to send the channel indication data. The method also includes forbidding, by the second device, a communication action on the channel within the time that corresponds to the channel indication data.

In a first possible implementation manner of the third aspect, the forbidding, by the second device, a communication action on the channel within the time that corresponds to the channel indication data includes: forbidding, by the second device, use of the channel within the time that corresponds to the channel indication data; and/or forbidding, by the second device, sensing of the channel within the time that corresponds to the channel indication data; and/or forbidding, by the second device, sounding of the channel within the time that corresponds to the channel indication data.

With reference to the third aspect or the first possible implementation manner of the third aspect, in a second possible implementation manner of the third aspect, the channel indication data includes a preset sounding reference signal (SRS), where the SRS includes a preset SRS pattern, or the SRS includes a combination of multiple SRS patterns.

With reference to the second possible implementation manner of the third aspect, in a third possible implementation manner of the third aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the second possible implementation manner of the third aspect or the third possible implementation manner of the third aspect, in a fourth possible implementation manner of the third aspect, the receiving, by a second device, the channel indication data sent by the UE includes: receiving, by the second device in an uplink subframe, the SRS sent by the UE; or receiving, by the second device in a downlink subframe, the SRS sent by the UE, where the downlink subframe is further used to transmit downlink data, and a location occupied by the SRS in the downlink subframe is configured by the first device.

According to a fourth aspect, the present invention provides a data transmission apparatus, where the apparatus is applied to a first device. The apparatus includes an indication unit, a receiving unit, and a transmission unit. The indication unit is configured to send, to user equipment (UE), a feedback request that is used to instruct to feed back channel indication data to a network device. The channel indication data is used to indicate that a channel is occupied by the first device within a time that corresponds to the channel indication data. The network device includes at least the first device. The receiving unit; and the transmission unit. The receiving unit is configured to receive the channel indication data sent by the UE. The transmission unit is configured to perform, within the time that corresponds to the channel indication data, data transmission with the UE by using the channel.

In a first possible implementation manner of the fourth aspect, the apparatus further includes: a determining unit, configured to determine whether the UE is suspected UE; and the sending unit is configured to: when the determining unit determines that the UE is suspected UE, send, to the user equipment (UE), the feedback request that is used to instruct to feed back the channel indication data to the network device, where the suspected UE includes UE that possibly suffers a hidden terminal problem (HTP).

With reference to the first possible implementation manner of the fourth aspect, in a second possible implementation manner of the fourth aspect, the determining unit includes: a receiving subunit, configured to receive signal information of first cell and signal information of second cell that are uploaded by the UE, where the signal information of first cell is cell signal information that is obtained by the UE by monitoring on the first device, and the second signal information is cell signal information that is obtained by the UE by monitoring on a second device included in the network device; and a determining subunit, configured to: determine whether a difference between the signal information of first cell and the signal information of second cell is less than or equal to a preset threshold; and if yes, determine that the UE is suspected UE, or if not, determine that the UE is not suspected UE.

With reference to the first possible implementation manner of the fourth aspect or the second possible implementation manner of the fourth aspect, in a third possible implementation manner of the fourth aspect, the receiving unit is configured to: before the first device transmits data to the UE, receive the channel indication data sent by the UE.

With reference to the fourth aspect, in a fourth possible implementation manner of the fourth aspect, the apparatus further includes: a notification unit, configured to receive a notification message that is sent by the UE and is used to indicate that the UE is suffering an HTP; and the sending unit is configured to send, to the UE according to the notification message, the feedback request that is used to instruct to feed back the channel indication data to the network device.

With reference to any one of the foregoing implementation manners of the fourth aspect, in a fifth possible implementation manner of the fourth aspect, the channel indication data includes a preset sounding reference signal (SRS), where the SRS includes a preset SRS pattern, or the SRS includes a combination of multiple SRS patterns.

With reference to the fifth possible implementation manner of the fourth aspect, in a sixth possible implementation manner of the fourth aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the fifth possible implementation manner of the fourth aspect or the sixth possible implementation manner of the fourth aspect, in a seventh possible implementation manner of the fourth aspect, the receiving unit is configured to receive, in an uplink subframe, the SRS sent by the UE; or the receiving unit is configured to receive, in a downlink subframe, the SRS sent by the UE, where the downlink subframe is further used to transmit downlink data, and a location occupied by the SRS in the downlink subframe is configured by the first device.

According to a fifth aspect, the present invention provides a UE, including: a receiving unit, a first sending unit, and a transmission unit. The receiving unit is configured to receive a feedback request that is sent by a first device and is used to instruct to feed back channel indication data to a network device. The channel indication data is used to indicate that a channel is occupied by the first device within a time that corresponds to the channel indication data. The network device includes at least the first device. The first sending unit is configured to send the channel indication data to the network device. The transmission unit is configured to perform, within the time that corresponds to the channel indication data, data transmission with the first device by using the channel.

In a first possible implementation manner of the fifth aspect, the UE further includes: a second sending unit, configured to send signal information of first cell and signal information of second cell to the first device, where the signal information of first cell is cell signal information that is obtained by monitoring on the first device, and the second signal information is cell signal information that is obtained by monitoring on a second device included in the network device, so that the first device sends the feedback request when the first device determines that a difference between the signal information of first cell and the signal information of second cell is less than or equal to a preset threshold.

With reference to the first possible implementation manner of the fifth aspect, in a second possible implementation manner of the fifth aspect, the first sending unit is configured to: before the UE transmits data to the first device, send the channel indication data to the network device.

With reference to the fifth aspect, in a third possible implementation manner of the fifth aspect, the UE further includes: a third sending unit, configured to send, to the first device, a notification message that is used to indicate that the UE is suffering an HTP, so that the first device sends the feedback request according to the notification message.

With reference to any one of the foregoing possible implementation manners of the fifth aspect, in a fourth possible implementation manner of the fifth aspect, the channel indication data includes a preset sounding reference signal (SRS), where the SRS includes a preset SRS pattern, or the SRS includes a combination of multiple SRS patterns.

With reference to the fourth possible implementation manner of the fifth aspect, in a fifth possible implementation manner of the fifth aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the fifth possible implementation manner of the fifth aspect or the sixth possible implementation manner of the fifth aspect, in a seventh possible implementation manner of the fifth aspect, the first sending unit is configured to send, in an uplink subframe, the SRS to the network device; or the first sending unit is configured to send, in a downlink subframe, the SRS to the network device, where the downlink subframe is further used to transmit downlink data, and a location occupied by the SRS in the downlink subframe is configured by the first device.

According to a sixth aspect, the present invention provides a data transmission apparatus, where the apparatus is applied to a second device. The apparatus includes a receiving unit and a forbidding unit. The receiving unit is configured to receive channel indication data sent by user equipment (UE). The channel indication data is used to indicate that a channel is occupied by a first device within a time that corresponds to the channel indication data. The network device includes at least the second device and the first device. The first device instructs the UE to send the channel indication data. The forbidding unit is configured to forbid a communication action on the channel within the time that corresponds to the channel indication data.

In a first possible implementation manner of the sixth aspect, the forbidding unit is configured to forbid use of the channel within the time that corresponds to the channel indication data; and/or the forbidding unit is configured to forbid sensing of the channel within the time that corresponds to the channel indication data; and/or the forbidding unit is configured to forbid sounding of the channel within the time that corresponds to the channel indication data.

With reference to the sixth aspect or the first possible implementation manner of the sixth aspect, in a second possible implementation manner of the sixth aspect, the channel indication data includes a preset sounding reference signal (SRS), where the SRS includes a preset SRS pattern, or the SRS includes a combination of multiple SRS patterns.

With reference to the second possible implementation manner of the sixth aspect, in a third possible implementation manner of the sixth aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the second possible implementation manner of the sixth aspect or the third possible implementation manner of the sixth aspect, in a fourth possible implementation manner of the sixth aspect, the receiving unit is configured to receive, in an uplink subframe, the SRS sent by the UE; or the receiving unit is configured to receive, in a downlink subframe, the SRS sent by the UE, where the downlink subframe is further used to transmit downlink data, and a location occupied by the SRS in the downlink subframe is configured by the first device.

According to a seventh aspect, the present invention provides a data transmission apparatus, where the apparatus is applied to a first device. The apparatus includes: a processor, a network interface, a memory, and a communications bus. The communications bus is configured to implement connection communication among the processor, the network interface, and the memory. The processor is configured to execute a program stored in the memory. The program includes sending, to user equipment (UE), a feedback request that is used to instruct to feed back channel indication data to a network device. The channel indication data is used to indicate that a channel is occupied by the first device within a time that corresponds to the channel indication data. The network device includes at least the first device. The program also includes receiving the channel indication data sent by the UE. The program further includes performing, within the time that corresponds to the channel indication data, data transmission with the UE by using the channel.

In a first possible implementation manner of the seventh aspect, the program executed by the processor further includes: determining whether the UE is suspected UE, and if yes, performing the step of sending, to user equipment (UE), a feedback request that is used to instruct to feed back channel indication data to a network device, where the suspected UE includes UE that possibly suffers a hidden terminal problem (HTP).

With reference to the first possible implementation manner of the seventh aspect, in a second possible implementation manner of the seventh aspect, the program that is executed by the processor to determine whether the UE suffers the HTP includes: receiving signal information of first cell and signal information of second cell that are uploaded by the UE, where the signal information of first cell is cell signal information that is obtained by the UE by monitoring on the first device, and the second signal information is cell signal information that is obtained by the UE by monitoring on a second device included in the network device; and determining whether a difference between the signal information of first cell and the signal information of second cell is less than or equal to a preset threshold; and if yes, determining that the UE is suspected UE, or if not, determining that the UE is not suspected UE.

With reference to the first possible implementation manner of the seventh aspect or the second possible implementation manner of the seventh aspect, in a third possible implementation manner of the seventh aspect, the program that is executed by the processor to receive the channel indication data sent by the UE includes: before the first device transmits data to the UE, receiving the channel indication data sent by the UE.

With reference to the seventh aspect, in a fourth possible implementation manner of the seventh aspect, the program executed by the processor further includes: receiving a notification message that is sent by the UE and is used to indicate that the UE is suffering an HTP; and the program that is executed by the processor to send, to the UE, the feedback request that is used to instruct to feed back the channel indication data to the network device includes: sending, to the UE according to the notification message, the feedback request that is used to instruct to feed back the channel indication data to the network device.

With reference to any one of the foregoing implementation manners of the seventh aspect, in a fifth possible implementation manner of the seventh aspect, the channel indication data includes a preset sounding reference signal (SRS), where the SRS includes a preset SRS pattern, or the SRS includes a combination of multiple SRS patterns.

With reference to the fifth possible implementation manner of the seventh aspect, in a sixth possible implementation manner of the seventh aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the fifth possible implementation manner of the seventh aspect or the sixth possible implementation manner of the seventh aspect, in a seventh possible implementation manner of the seventh aspect, the program that is executed by the processor to receive the channel indication data sent by the UE includes: receiving, in an uplink subframe, the SRS sent by the UE; or receiving, in a downlink subframe, the SRS sent by the UE, where the downlink subframe is further used to transmit downlink data, and a location occupied by the SRS in the downlink subframe is configured by the first device.

According to an eighth aspect, the present invention provides a UE. The UE includes a processor, a network interface, a memory, and a communications bus. The communications bus is configured to implement connection communication among the processor, the network interface, and the memory. The processor is configured to execute a program stored in the memory. The program includes receiving a feedback request that is sent by a first device and is used to instruct to feed back channel indication data to a network device. The channel indication data is used to indicate that a channel is occupied by the first device within a time that corresponds to the channel indication data. The network device includes at least the first device. The program also includes sending the channel indication data to the network device. The program further includes performing, within the time that corresponds to the channel indication data, data transmission with the first device by using the channel.

In a first possible implementation manner of the eighth aspect, the program executed by the processor further includes: sending signal information of first cell and signal information of second cell to the first device, where the signal information of first cell is cell signal information that is obtained by monitoring on the first device, and the second signal information is cell signal information that is obtained by monitoring on a second device included in the network device, so that the first device sends the feedback request when the first device determines that a difference between the signal information of first cell and the signal information of second cell is less than or equal to a preset threshold.

With reference to the first possible implementation manner of the eighth aspect, in a second possible implementation manner of the eighth aspect, the program that is executed by the processor to send the channel indication data to the network device includes: before the UE transmits data to the first device, sending the channel indication data to the network device.

With reference to the eighth aspect, in a third possible implementation manner of the eighth aspect, the program executed by the processor further includes: sending, to the first device, a notification message that is used to indicate that the UE is suffering an HTP, so that the first device sends the feedback request according to the notification message.

With reference to any one of the foregoing implementation manners of the eighth aspect, in a fourth possible implementation manner of the eighth aspect, the channel indication data includes a preset sounding reference signal (SRS), where the SRS includes a preset SRS pattern, or the SRS includes a combination of multiple SRS patterns.

With reference to the fourth possible implementation manner of the eighth aspect, in a fifth possible implementation manner of the eighth aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the fourth possible implementation manner of the eighth aspect or the fifth possible implementation manner of the eighth aspect, in a sixth possible implementation manner of the eighth aspect, the program that is executed by the processor to send the channel indication data to the network device includes: sending, in an uplink subframe, the SRS to the network device; or sending, in a downlink subframe, the SRS to the network device, where the downlink subframe is further used to transmit downlink data, and a location occupied by the SRS in the downlink subframe is configured by the first device.

According to a ninth aspect, the present invention provides a data transmission apparatus, where the apparatus is applied to a second device. The apparatus includes: a processor, a network interface, a memory, and a communications bus. The communications bus is configured to implement connection communication among the processor, the network interface, and the memory. The processor is configured to execute a program stored in the memory. The program includes receiving channel indication data sent by user equipment (UE). The channel indication data is used to indicate that a channel is occupied by a first device within a time that corresponds to the channel indication data. The network device includes at least the second device and the first device. The first device instructs the UE to send the channel indication data. The program further includes forbidding a communication action on the channel within the time that corresponds to the channel indication data.

In a first possible implementation manner of the ninth aspect, the program that is executed by the processor to forbid the communication action on the channel within the time that corresponds to the channel indication data includes: forbidding use of the channel within the time that corresponds to the channel indication data; and/or forbidding sensing of the channel within the time that corresponds to the channel indication data; and/or forbidding sounding of the channel within the time that corresponds to the channel indication data.

With reference to the ninth aspect or the first possible implementation manner of the ninth aspect, in a second possible implementation manner of the ninth aspect, the channel indication data includes a preset sounding reference signal (SRS), where the SRS includes a preset SRS pattern, or the SRS includes a combination of multiple SRS patterns.

With reference to the second possible implementation manner of the ninth aspect, in a third possible implementation manner of the ninth aspect, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

With reference to the second possible implementation manner of the ninth aspect or the third possible implementation manner of the ninth aspect, in a fourth possible implementation manner of the ninth aspect, the program that is executed by the processor to receive the channel indication data sent by the UE includes: receiving, in an uplink subframe, the SRS sent by the UE; or receiving, in a downlink subframe, the SRS sent by the UE, where the downlink subframe is further used to transmit downlink data, and a location occupied by the SRS in the downlink subframe is configured by the first device.

In the foregoing technical solutions, a first device sends, to user equipment (UE), a feedback request that is used to instruct to feed back channel indication data to a network device. The channel indication data is used to indicate that a channel is occupied by the first device within a time that corresponds to the channel indication data. The network device includes at least the first device. The first device receives the channel indication data sent by the UE. The first device performs, within the time that corresponds to the channel indication data, data transmission with the UE by using the channel. In this way, when data transmission is performed between the first device and the UE within the foregoing time, the data transmission does not suffer interference from another network device. Therefore, the UE does not suffer an interference jitter phenomenon.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a first device may be a base station such as an evolved or enhanced Node B (eNB) or a small cell eNB or a Node B (NB), or a first device may be an AP in a WiFi network. A second device may be any one or more of devices, for example: an eNB or a small cell eNB or an NB or an AP, that may perform data transmission with UE other than the foregoing first device in a network device in the field of communications technologies. The foregoing network device may be a communications device in the field of communications technologies that may transmit downlink data to the UE and receive uplink data sent by the UE.

In addition, the UE in the embodiments of the present invention may be any device having a communication function, for example: a tablet computer, a mobile phone, an electronic reader, a remote control, a personal computer (PC), a notebook computer, an in-vehicle device, a web television, a wearable device, or another smart device.

Figure 1:
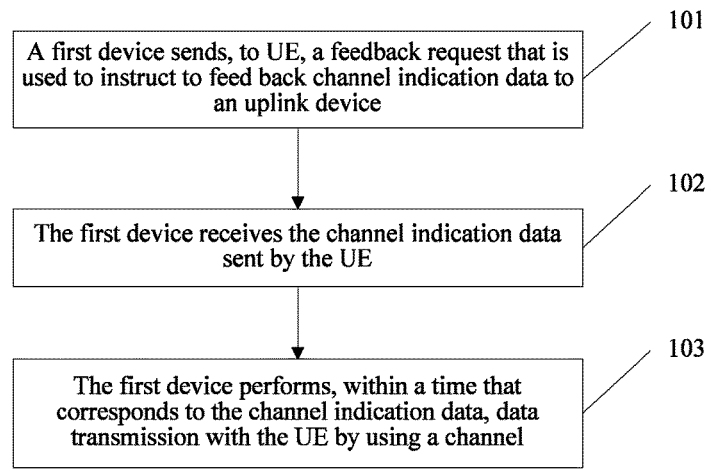
FIG. 1 is a schematic flowchart of a data transmission method according to an embodiment of the present invention.

Referring to FIG. 1, FIG. 1 is a schematic flowchart of a data transmission method according to an embodiment of the present invention. As shown in FIG. 1, the method includes the following steps.

101: A first device sends, to UE, a feedback request that is used to instruct to feed back channel indication data to a network device, where the channel indication data is used to indicate that a channel is occupied by the first device within a time that corresponds to the channel indication data, and the network device includes at least the first device.

Optionally, after receiving the feedback request, the UE obtains the channel indication data, and reports the channel indication data. In addition, the channel indication data may be prestored in the UE. In addition, the channel indication data corresponds to one time value in advance. For example: the channel indication data corresponds to 100 milliseconds (ms), and the channel indication data indicates that the channel is occupied by the first device in the duration of 100 ms. The duration may be counted when the channel indication data is sent. In addition, the network device knows, in advance, the time that corresponds to the channel indication data. In this way, the time may not be carried in the channel indication data, and the time that corresponds to the channel indication data and that is obtained in advance may be obtained as long as the network device receives the indication data. In addition, the channel indication data refers to any data that can be transmitted between the UE and the network device and that may indicate that the channel is occupied by the first device within the time that corresponds to the channel indication data, for example: a sounding reference signal (SRS) or another uplink transmit signal. This is not limited in this embodiment. In addition, the network device may be a device that can currently receive an uplink signal sent by the UE.

Optionally, the foregoing channel may be a downlink channel that is used to transmit downlink data to the UE, or a particular spectrum that is used to transmit downlink data to the UE.

102: The first device receives the channel indication data sent by the UE.

Optionally, the UE may send the channel indication data to all devices included in the network device. For example, a current location of the UE falls within an area in which a coverage of the first device intersects with a coverage of the second device. For example, in this case, the first device may perform data transmission with the UE, and the second device may detect the channel that is used by the first device to perform data transmission with the UE. In this way, after receiving the channel indication data, the second device does not perform a communication action on the foregoing channel within the corresponding time.

103: The first device performs, within the time that corresponds to the channel indication data, data transmission with the UE by using the channel.

By means of the foregoing method, only the first device can perform data transmission with the UE within the time that corresponds to the channel indication data. Therefore, the UE does not suffer an HTP within the time. In addition, the UE may also send one or more pieces of channel indication data to the network device according to a need, so as to ensure that within one or more times, when the first device performs data transmission with the UE, the data transmission suffers no interference from another network device.

In this embodiment, a first device sends, to user equipment (UE), a feedback request that is used to instruct to feed back channel indication data to a network device. The channel indication data is used to indicate that a channel is occupied by the first device within a time that corresponds to the channel indication data. The network device includes at least the first device. The first device receives the channel indication data sent by the UE. The first device performs, within the time that corresponds to the channel indication data, data transmission with the UE by using the channel. In this way, when data transmission is performed between the first device and the UE within the foregoing time, the data transmission does not suffer interference from another network device. Therefore, the UE does not suffer an interference jitter phenomenon.

Figure 2:
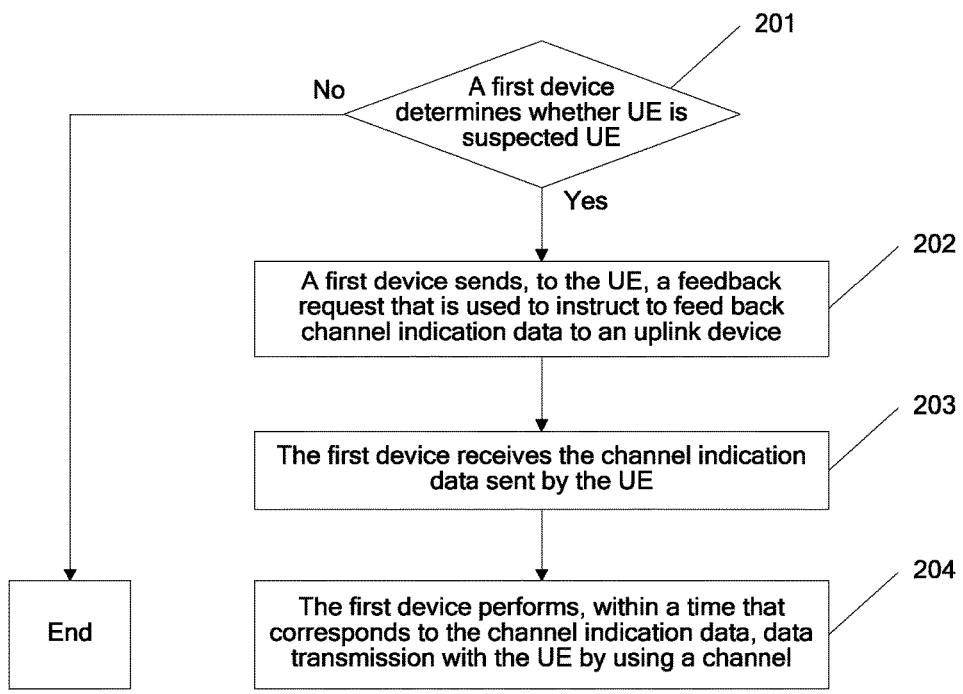
FIG. 2 is a schematic flowchart of another data transmission method according to an embodiment of the present invention.

Referring to FIG. 2, FIG. 2 is a schematic flowchart of another data transmission method according to an embodiment of the present invention. As shown in FIG. 2, the method includes the following steps.

201: A first device determines whether the UE is suspected UE, and if yes, performs step 202, where the suspected UE includes UE that possibly suffers an HTP.

Optionally, if a result of the determining is not, the procedure may be ended, or step 201 may be repeated.

Optionally, the UE that possibly suffers the HTP may be construed as that the UE possibly suffers the HTP in a next period of time. That is, the UE has a possibility to suffer the HTP.

Optionally, step 201 may include: receiving, by the first device, signal information of first cell and signal information of second cell that are uploaded by the UE, where the signal information of first cell is cell signal information that is obtained by the UE by monitoring on the first device, and the second signal information is cell signal information that is obtained by the UE by monitoring on a second device included in the network device; and determining, by the first device, whether a difference between the signal information of first cell and the signal information of second cell is less than or equal to a preset threshold; and if yes, determining that the UE is suspected UE, or if not, determining that the UE is not suspected UE.

Optionally, the cell signal information may be information that is used to indicate cell signal strength monitored by the UE. For example: the foregoing cell signal information may include any one or more of the following items: a reference signal received power (RSRP); a reference signal received quality (RSRQ); or a received signal strength indicator (RSSI).

The RSRP is used as an example for description. When determining that a difference between a first RSRP that is obtained by the UE by monitoring on the first device and a second RSRP that is obtained by the UE by monitoring on the second device is less than or equal to the preset threshold, the first device determines that the UE is suspected UE.

202: The first device sends, to the user equipment (UE), a feedback request that is used to instruct to feed back channel indication data to a network device, where the channel indication data is used to indicate that a channel is occupied by the first device within a time that corresponds to the channel indication data, and the network device includes at least the first device.

203: The first device receives the channel indication data sent by the UE.

Optionally, step 203 may include: before the first device transmits data to the UE, receiving, by the first device, the channel indication data sent by the UE.

In this way, the UE may be instructed to feed back the channel indication data in advance, so that the UE can be prevented in advance from suffering the HTP. For example: when the first device needs to transmit downlink data to the UE, that is, the first device needs to schedule a downlink subframe, the UE is instructed to feed back the channel indication data ahead of at least one subframe. In this way, when the first device transmits the data to the UE, no other network device performs any communication action on the foregoing channel within the time.

204: The first device performs, within the time that corresponds to the channel indication data, data transmission with the UE by using the channel.

Optionally, the channel indication data may include a preset SRS. The SRS may include a preset SRS pattern, or the SRS may include a combination of multiple SRS patterns. The SRS pattern is used to indicate that the channel is occupied by the first device within a time that corresponds to the SRS pattern. That is, after receiving the SRS, the first device knows that no other network device uses the foregoing channel within the time that corresponds to the SRS, so that the first device may not sound the channel, but to transmit the data to the UE within the time. In addition, after receiving the SRS, a network device other than the first device in the network device knows that the foregoing channel is occupied by another device within the time that corresponds to the SRS, so as to forbid a communication action on the channel within the time.

Optionally, the SRS pattern may be an SRS pattern whose energy exceeds a preset energy value. For example: the SRS pattern may be a combination of multiple SRS patterns. That is, the UE is allowed to simultaneously use multiple SRS patterns. In this way, when a network device detects that a parametric value of the SRS pattern exceeds the preset energy value, the network device forbids a communication action on the channel within the time. Alternatively, when detecting that a parametric value of the SRS pattern exceeds the preset energy value, the first device may transmit the data to the UE within the time.

Certainly, in some scenarios, the SRS pattern may not be reflected on energy, but the network device may directly identify the SRS pattern.

Optionally, the SRS may include: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

It should be noted that the SRS has a new interpretation in this embodiment and is different from an existing SRS. The corresponding time is configured during generation of the SRS. The time that corresponds to the SRS may be construed as a minimum granularity of preventing a corresponding communication action, on the foregoing channel, of a device other than the first device in the network device. That is, the UE may transmit multiple SRSs according to a need.

Optionally, the step of receiving, by the first device, the channel indication data sent by the UE may include: receiving, by the first device in an uplink subframe, the SRS sent by the UE.

In this way, the UE can transmit the SRS by using the subframe. For example, the last one or more orthogonal frequency division multiplexing (OFDM) symbols of the uplink subframe are used to transmit the SRS.

Optionally, the step of receiving, by the first device, the channel indication data sent by the UE may include: receiving, by the first device in a downlink subframe, the SRS sent by the UE, where the downlink subframe is further used to transmit downlink data.

Optionally, a location occupied by the SRS in the downlink subframe may be configured by the first device. For example, a location of an OFDM symbol occupied by the SRS in the downlink subframe may be configured by the first device. That is, the location of the OFDM symbol occupied by the SRS in the downlink subframe is changeable. In this way, the location of the OFDM symbol occupied by the SRS in the downlink subframe may be adjusted according to a different case.

In this implementation manner, the UE may use the downlink subframe to transmit the SRS to the network device. The downlink subframe may be a hybrid subframe. For example, the downlink data is transmitted in a previous OFDM symbol in the downlink subframe, and the last one or more OFDM symbols in the downlink subframe are used by the UE to transmit the SRS to the network device. In addition, it should be noted that, an SRS transmission location in the downlink subframe is adjustable. That is, the UE may transmit the SRS in a different location of the downlink subframe according to a different case.

In this embodiment, multiple optional implementation manners are added based on the embodiment shown in FIG. 1, and in each optional implementation manner, UE can be prevented from suffering an interference jitter phenomenon. In addition, the implementation manners in this embodiment may be applied to the embodiment shown in FIG. 1.

Figure 3:
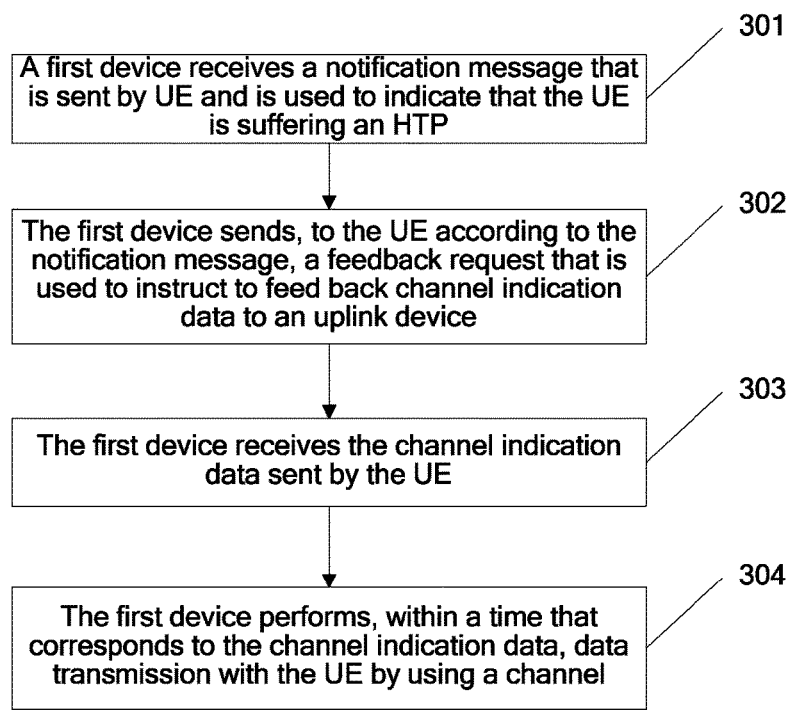
FIG. 3 is a schematic flowchart of another data transmission method according to an embodiment of the present invention.

Referring to FIG. 3, FIG. 3 is a schematic flowchart of another data transmission method according to an embodiment of the present invention. As shown in FIG. 3, the method includes the following steps.

301: A first device receives a notification message that is sent by the UE and is used to indicate that the UE is suffering an HTP.

The notification message may be signal data that may be sent by any UE to a network device.

302: The first device sends, to the UE according to the notification message, a feedback request that is used to instruct to feed back channel indication data to a network device, where the channel indication data is used to indicate that a channel is occupied by the first device within a time that corresponds to the channel indication data, and the network device includes at least the first device.

After receiving the notification message, the first device may send, to the UE, the feedback request that is used to instruct to feed back the channel indication data to the network device.

303: The first device receives the channel indication data sent by the UE.

304: The first device performs, within the time that corresponds to the channel indication data, data transmission with the UE by using the channel.

By means of the foregoing method, when UE possibly suffers or is suffering an HTP, another network device can be prevented in time from transmitting data to the UE, so that the HTP that the UE is currently suffering can be resolved.

Optionally, the channel indication data may include a preset SRS. The SRS may include a preset SRS pattern, or the SRS may include a combination of multiple SRS patterns. The SRS pattern is used to indicate that the channel is occupied by the first device within a time that corresponds to the SRS pattern. That is, after receiving the SRS, the first device knows that no other network device uses the foregoing channel within the time that corresponds to the SRS, so that the first device may not sound the channel, but to transmit the data to the UE within the time. In addition, after receiving the SRS, a network device other than the first device in the network device knows that the foregoing channel is occupied by another device within the time that corresponds to the SRS, so as to forbid a communication action on the channel within the time.

Optionally, the SRS pattern may be an SRS pattern whose energy exceeds a preset energy value. For example: the SRS pattern may be a combination of multiple SRS patterns. That is, the UE is allowed to simultaneously use multiple SRS patterns. In this way, when a network device detects that a parametric value of the SRS pattern exceeds the preset energy value, the network device forbids a communication action on the channel within the time. Alternatively, when detecting that a parametric value of the SRS pattern exceeds the preset energy value, the first device may transmit the data to the UE within the time.

Certainly, in some scenarios, the SRS pattern may not be reflected on energy, but the network device may directly identify the SRS pattern.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM, where a time that corresponds to the SRS is configured by the OAM.

It should be noted that the SRS has a new interpretation in this embodiment and is different from an existing SRS.

The corresponding time is configured during generation of the SRS. The time that corresponds to the SRS may be construed as a minimum granularity of preventing a corresponding communication action, on the foregoing channel, of a device other than the first device in the network device. That is, the UE may transmit multiple SRSs according to a need.

Optionally, the step of receiving, by the first device, the channel indication data sent by the UE may include: receiving, by the first device in an uplink subframe, the SRS sent by the UE.

In this way, the UE can transmit the SRS by using the subframe. For example, the last one or more orthogonal frequency division multiplexing (OFDM) symbols of the uplink subframe are used to transmit the SRS.

Optionally, the step of receiving, by the first device, the channel indication data sent by the UE may include: receiving, by the first device in a downlink subframe, the SRS sent by the UE, where the downlink subframe is further used to transmit downlink data.

Optionally, a location occupied by the SRS in the downlink subframe may be configured by the first device. For example, a location of an OFDM symbol occupied by the SRS in the downlink subframe may be configured by the first device. That is, the location of the OFDM symbol occupied by the SRS in the downlink subframe is changeable. In this way, the location of the OFDM symbol occupied by the SRS in the downlink subframe may be adjusted according to a different case.

In this implementation manner, the UE may use the downlink subframe to transmit the SRS to the network device. The downlink subframe may be a hybrid subframe. For example, the downlink data is transmitted in a previous OFDM symbol in the downlink subframe, and the last one or more OFDM symbols in the downlink subframe are used by the UE to transmit the SRS to the network device.

It should be noted that this embodiment may also be implemented with reference to the embodiment shown in FIG. 2.

In this embodiment, multiple optional implementation manners are added based on the embodiment shown in FIG. 1, and in each optional implementation manner, UE can be prevented from suffering an interference jitter phenomenon. In addition, the implementation manners in this embodiment may be applied to the embodiment shown in FIG. 1.

Figure 4:
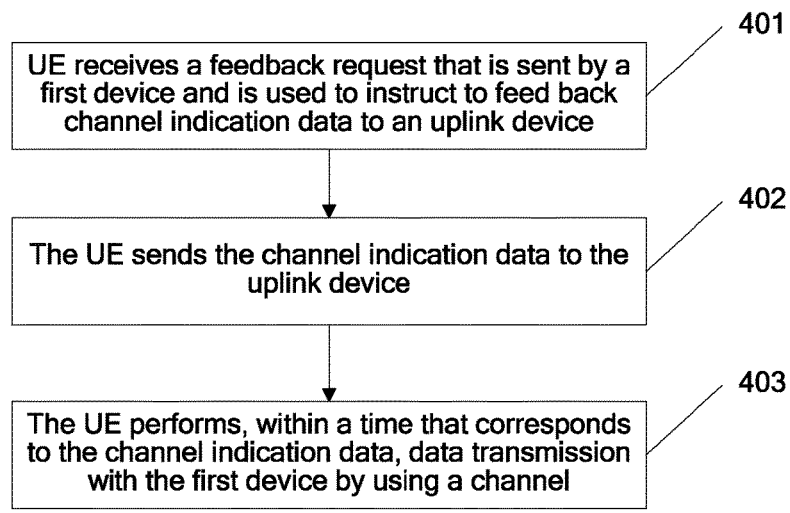
FIG. 4 is a schematic flowchart of another data transmission method according to an embodiment of the present invention.

Referring to FIG. 4, FIG. 4 is a schematic flowchart of another data transmission method according to an embodiment of the present invention. As shown in FIG. 4, the method includes the following steps.

401: UE receives a feedback request that is sent by a first device and is used to instruct to feed back channel indication data to a network device, where the channel indication data is used to indicate that a channel is occupied by the first device within a time that corresponds to the channel indication data, and the network device includes at least the first device.

402: The UE sends the channel indication data to the network device.

403: The UE performs, within the time that corresponds to the channel indication data, data transmission with the first device by using the channel.

Optionally, the UE may obtain the channel indication data in advance, or temporarily generate the channel indication data.

Optionally, before step 401, the method may further include: sending, by the UE, signal information of first cell and signal information of second cell to the first device, where the signal information of first cell is cell signal information that is obtained by monitoring on the first device, and the second signal information is cell signal information that is obtained by monitoring on a second device included in the network device, so that the first device sends the feedback request when the first device determines that a difference between the signal information of first cell and the signal information of second cell is less than or equal to a preset threshold.

In this way, when determining that the difference between the signal information of first cell and the signal information of second cell is less than or equal to the preset threshold, the first device may send the feedback request.

Optionally, step 402 may include: before the UE transmits data to the first device, sending, by the UE, the channel indication data to the network device.

In this way, the UE can be prevented in advance from suffering an HTP.

Optionally, before step 401, the method may further include: sending, by the UE to the first device, a notification message that is used to indicate that the UE is suffering an HTP, so that the first device sends the feedback request according to the notification message.

The notification message may be sent when the UE is suffering the HTP.

In this implementation manner, the UE can be prevented in time from suffering the HTP.

Optionally, the channel indication data may include a preset SRS. The SRS may include a preset SRS pattern, or the SRS may include a combination of multiple SRS patterns.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM entity, where a time that corresponds to the SRS is configured by the OAM entity.

Optionally, the step of sending, by the UE, the channel indication data to the network device may include: sending, by the UE in an uplink subframe, the SRS to the network device; or sending, by the UE in a downlink subframe, the SRS to the network device, where the downlink subframe is further used to transmit downlink data.

Optionally, a location occupied by the SRS in the downlink subframe may be configured by the first device.

In this implementation manner, the UE may transmit the SRS in the uplink subframe, or the UE may transmit the SRS in the downlink subframe. The downlink subframe may be a hybrid subframe.

In this embodiment, UE receives a feedback request that is sent by a first device and is used to instruct to feed back channel indication data to a network device. The channel indication data is used to indicate that a channel is occupied by the first device within a time that corresponds to the channel indication data. The network device includes at least the first device. The UE sends the channel indication data to the network device. The UE performs, within the time that corresponds to the channel indication data, data transmission with the first device by using the channel. In this way, UE can be prevented from suffering an interference jitter phenomenon.

Figure 5:
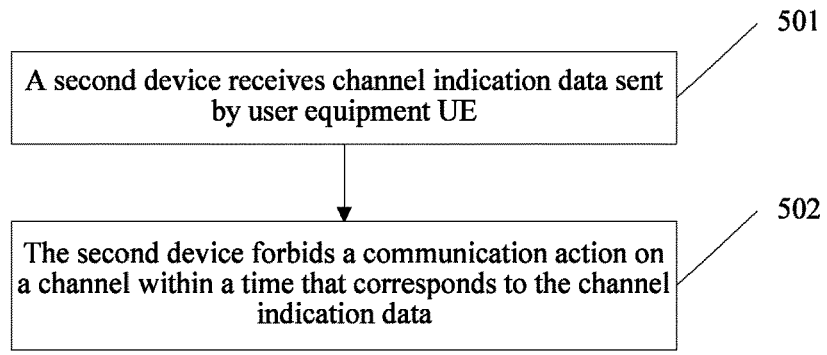
FIG. 5 is a schematic flowchart of another data transmission method according to an embodiment of the present invention.

Referring to FIG. 5, FIG. 5 is a schematic flowchart of another data transmission method according to an embodiment of the present invention. As shown in FIG. 5, the method includes the following steps.

501: A second device receives channel indication data sent by user equipment (UE), where the channel indication data is used to indicate that a channel is occupied by a first device within a time that corresponds to the channel indication data, the network device includes at least the second device and the first device, and the first device instructs the UE to send the channel indication data.

Optionally, the first device may instruct the UE to send the channel indication data to the network device. For a specific implementation process, refer to the descriptions in the foregoing embodiments.

502: The second device forbids a communication action on the channel within the time that corresponds to the channel indication data.

After receiving the channel indication data, the second device knows that the foregoing channel is occupied by the first device within the time that corresponds to the channel indication data, so that the second device forbids the communication action on the channel within the time.

Optionally, the step of forbidding, by the second device, a communication action on the channel within the time that corresponds to the channel indication data may include: forbidding, by the second device, use of the channel within the time that corresponds to the channel indication data; and/or forbidding, by the second device, sensing of the channel within the time that corresponds to the channel indication data; and/or forbidding, by the second device, sounding of the channel within the time that corresponds to the channel indication data.

By means of the foregoing steps, the second device can be forbidden from sensing, sounding, and/or using the foregoing information within the time that corresponds to the indication channel data. In this way, when the first device performs data transmission with the UE within the time that corresponds to the indication channel data, the UE does not suffer an HTP.

Optionally, the channel indication data may include a preset SRS. The SRS may include a preset SRS pattern, or the SRS may include a combination of multiple SRS patterns. The SRS pattern is used to indicate that the channel is occupied by the first device within a time that corresponds to the SRS pattern. That is, after receiving the SRS, the first device knows that no other network device uses the foregoing channel within the time that corresponds to the SRS, so that the first device may not sound the channel, but to transmit the data to the UE within the time. In addition, after receiving the SRS, the second device knows that the foregoing channel is occupied by another device within the time that corresponds to the SRS, so as to forbid a communication action on the channel within the time.

Optionally, the SRS pattern may be an SRS pattern whose energy exceeds a preset energy value. For example: the SRS pattern may be a combination of multiple SRS patterns. That is, the UE is allowed to simultaneously use multiple SRS patterns. In this way, when the second device detects that a parametric value of the SRS pattern exceeds the preset energy value, the second device forbids a communication action on the channel within the time. Alternatively, when detecting that a parametric value of the SRS pattern exceeds the preset energy value, the first device may transmit the data to the UE within the time.

Certainly, in some scenarios, the SRS pattern may not be reflected on energy, but the network device may directly identify the SRS pattern.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM entity, where a time that corresponds to the SRS is configured by the OAM entity.

It should be noted that the SRS has a new interpretation in this embodiment and is different from an existing SRS. The corresponding time is configured during generation of the SRS. The time that corresponds to the SRS may be construed as a minimum granularity of preventing a corresponding communication action, on the foregoing channel, of a device other than the first device in the network device. That is, the UE may transmit multiple SRSs according to a need.

Optionally, the receiving, by a second device, the channel indication data sent by the UE may include: receiving, by the second device in an uplink subframe, the SRS sent by the UE.

In this way, the UE can transmit the SRS by using the subframe. For example, the last one or more OFDM symbols of the uplink subframe are used to transmit the SRS.

Optionally, the receiving, by a second device, the channel indication data sent by the UE may include: receiving, by the second device in a downlink subframe, the SRS sent by the UE, where the downlink subframe is further used to transmit downlink data.

Optionally, a location occupied by the SRS in the downlink subframe may be configured by the first device.

In this implementation manner, the UE may use the downlink subframe to transmit the SRS to the network device. The downlink subframe may be a hybrid subframe. For example, the downlink data is transmitted in a previous OFDM symbol in the downlink subframe, and the last one or more OFDM symbols in the downlink subframe are used by the UE to transmit the SRS to the network device.

In this embodiment, a second device receives channel indication data sent by user equipment (UE). The channel indication data is used to indicate that a channel is occupied by a first device within a time that corresponds to the channel indication data. The network device includes at least the second device and the first device, and the first device instructs the UE to send the channel indication data. The second device forbids a communication action on the channel within the time that corresponds to the channel indication data. In this way, UE can be prevented from suffering an interference jitter phenomenon.

The following are apparatus embodiments of the present invention. The apparatus embodiments of the present invention are used to execute the methods implemented in method embodiments 1 to 5 of the present invention. For ease of description, only parts related to the embodiments of the present invention are shown. For specific technical details that are not disclosed, refer to Embodiment 1, Embodiment 2, Embodiment 3, Embodiment 4, and Embodiment 5 of the present invention.

Figure 6:
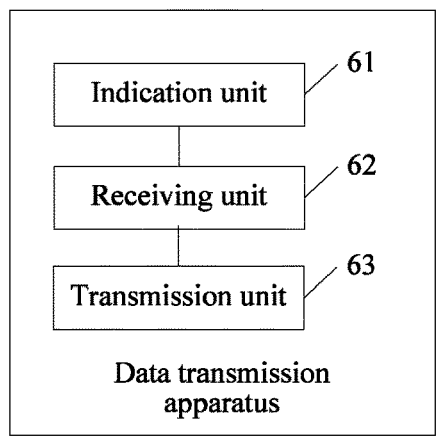
FIG. 6 is a schematic structural diagram of a data transmission apparatus according to an embodiment of the present invention.

Referring to FIG. 6, FIG. 6 is a schematic structural diagram of a data transmission apparatus according to an embodiment of the present invention. The apparatus may be applied to a first device. That is, the first device, for example, the first device described in the foregoing method embodiments, may include the apparatus. As shown in FIG. 6, the apparatus includes: an indication unit 61, a receiving unit 62, and a transmission unit 63.

The indication unit 61 is configured to send, to user equipment (UE), a feedback request that is used to instruct to feed back channel indication data to a network device, where the channel indication data is used to indicate that a channel is occupied by the first device within a time that corresponds to the channel indication data, and the network device includes at least the first device.

Optionally, after receiving the feedback request, the UE obtains the channel indication data, and reports the channel indication data. In addition, the channel indication data may be pre-stored in the UE. In addition, the channel indication data corresponds to one time value in advance. For example: the channel indication data corresponds to 100 milliseconds (ms), and the channel indication data indicates that the channel is occupied by the first device in the 100 ms. The 100 ms may be counted when the channel indication data is sent. In addition, the network device knows, in advance, the time that corresponds to the channel indication data. In this way, the time may not be carried in the channel indication data, and the time that corresponds to the channel indication data and that is obtained in advance may be obtained as long as the network device receives the indication data. In addition, the channel indication data refers to any data that can be transmitted between the UE and the network device and that may indicate that the channel is occupied by the first device within the time that corresponds to the channel indication data, for example: an SRS or another uplink transmit signal. This is not limited in this embodiment.

Optionally, the foregoing channel may be a downlink channel that is used to transmit downlink data to the UE, or a particular spectrum that is used to transmit downlink data to the UE.

The receiving unit 62 is configured to receive the channel indication data sent by the UE.

Optionally, the UE may send the channel indication data to all devices included in the network device. For example, a current location of the UE falls within an area covered jointly by the first device and the second device. That is, in this case, the first device may perform data transmission with the UE, and the second device may also perform data transmission with the UE. In this way, after receiving the channel indication data, the second device does not perform a communication action on the foregoing channel within the corresponding time.

The transmission unit 63 is configured to perform, within the time that corresponds to the channel indication data, data transmission with the UE by using the channel.

By means of the foregoing apparatus, only the first device can perform data transmission with the UE within the time that corresponds to the channel indication data. Therefore, the UE does not suffer an HTP within the time. In addition, the UE may also send one or more pieces of channel indication data to the network device according to a need, so as to receive, within one or more times, only the data sent by the first device.

In this embodiment, a first device sends, to user equipment (UE), a feedback request that is used to instruct to feed back channel indication data to a network device. The channel indication data is used to indicate that a channel is occupied by the first device within a time that corresponds to the channel indication data. The network device includes at least the first device. The first device receives the channel indication data sent by the UE. The first device performs, within the time that corresponds to the channel indication data, data transmission with the UE by using the channel. In this way, when data transmission is performed between the first device and the UE within the foregoing time, the data transmission does not suffer interference from another network device. Therefore, the UE does not suffer an interference jitter phenomenon.

Figure 7:
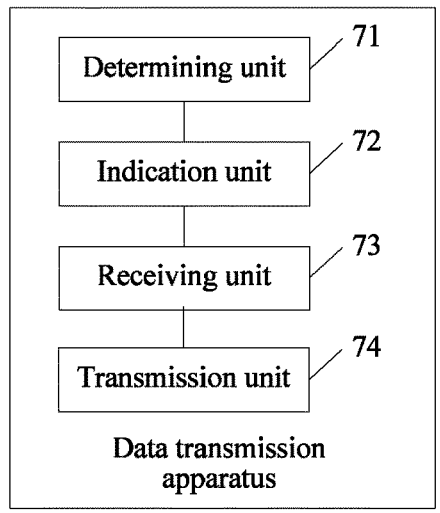
FIG. 7 is a schematic structural diagram of another data transmission apparatus according to an embodiment of the present invention.

Referring to FIG. 7, FIG. 7 is a schematic structural diagram of another data transmission apparatus according to an embodiment of the present invention. The apparatus may be applied to a first device. That is, the first device, for example, the first device described in the foregoing method embodiments, may include the apparatus. As shown in FIG. 7, the apparatus includes: a determining unit 71, an indication unit 72, a receiving unit 73, and a transmission unit 74.

The determining unit 71 is configured to determine whether the UE is suspected UE, where the suspected UE includes UE that possibly suffers an HTP.

Optionally, the UE that possibly suffers the HTP may be construed as that the UE possibly suffers the HTP in a next period of time. That is, the UE has a possibility to suffer the HTP.

The sending unit 72 is configured to: when the determining unit 71 determines that the UE is suspected UE, send, to the user equipment (UE), a feedback request that is used to instruct to feed back channel indication data to a network device, where the channel indication data is used to indicate that a channel is occupied by the first device within a time that corresponds to the channel indication data, and the network device includes at least the first device.

The receiving unit 73 is configured to receive the channel indication data sent by the UE.

The transmission unit 74 is configured to perform, within the time that corresponds to the channel indication data, data transmission with the UE by using the channel.

Figure 8:
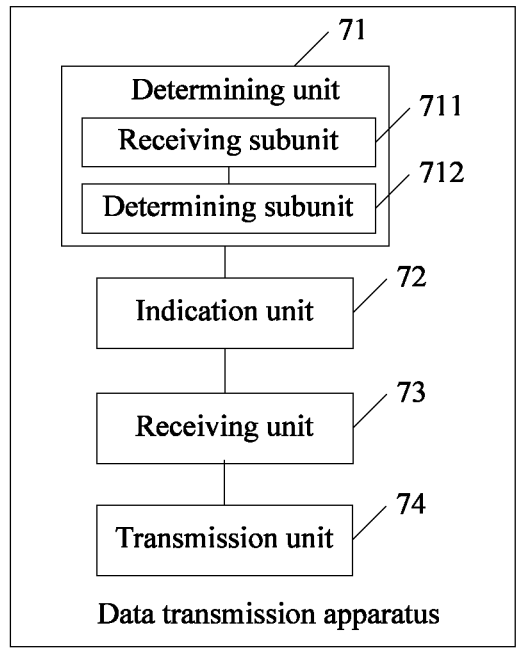
FIG. 8 is a schematic structural diagram of another data transmission apparatus according to an embodiment of the present invention.

Optionally, as shown in FIG. 8, the determining unit 71 may include: a receiving subunit 711, configured to receive signal information of first cell and signal information of second cell that are uploaded by the UE, where the signal information of first cell is cell signal information that is obtained by the UE by monitoring on the first device, and the second signal information is cell signal information that is obtained by the UE by monitoring on a second device included in the network device; and a determining subunit 712, configured to: determine whether a difference between the signal information of first cell and the signal information of second cell is less than or equal to a preset threshold; and if yes, determine that the UE is suspected UE, or if not, determine that the UE is not suspected UE.

Optionally, the cell signal information may be information that is used to indicate cell signal strength monitored by the UE. For example: the foregoing cell signal information may include any one or more of the following items: a reference signal received power (RSRP); a reference signal received quality (RSRQ); or a received signal strength indicator (RSSI).

The RSRP is used as an example for description. When determining that a difference between a first RSRP that is obtained by the UE by monitoring on the first device and a second RSRP that is obtained by the UE by monitoring on the second device is less than or equal to the preset threshold, the first device determines that the UE is suspected UE.

Optionally, the receiving unit 73 may be configured to: before the first device transmits data to the UE, receive the channel indication data sent by the UE.

In this way, the UE may be instructed to feed back the channel indication data in advance, so that the UE can be prevented in advance from suffering the HTP. For example: when the first device needs to transmit downlink data to the UE, that is, the first device needs to schedule a downlink subframe, the UE is instructed to feed back the channel indication data ahead of at least one subframe. In this way, when the first device transmits the data to the UE, no other network device transmits data to the UE within the time.

Optionally, the channel indication data may include a preset SRS. The SRS may include a preset SRS pattern, or the SRS may include a combination of multiple SRS patterns. The SRS pattern is used to indicate that the channel is occupied by the first device within a time that corresponds to the SRS pattern. That is, after receiving the SRS, the first device knows that no other network device uses the foregoing channel within the time that corresponds to the SRS, so that the first device may not sound the channel, but to transmit the data to the UE within the time. In addition, after receiving the SRS, a network device other than the first device in the network device knows that the foregoing channel is occupied by another device within the time that corresponds to the SRS, so as to forbid a communication action on the channel within the time.

Optionally, the SRS pattern may be an SRS pattern whose energy exceeds a preset energy value. For example: the SRS pattern may be a combination of multiple SRS patterns. That is, the UE is allowed to simultaneously use multiple SRS patterns. In this way, when a network device detects that a parametric value of the SRS pattern exceeds the preset energy value, the network device forbids a communication action on the channel within the time. Alternatively, when detecting that a parametric value of the SRS pattern exceeds the preset energy value, the first device may transmit the data to the UE within the time.

Certainly, in some scenarios, the SRS pattern may not be reflected on energy, but the network device may directly identify the SRS pattern.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM entity, where a time that corresponds to the SRS is configured by the OAM entity.

It should be noted that the SRS has a new interpretation in this embodiment and is different from an existing SRS. The corresponding time is configured during generation of the SRS. The time that corresponds to the SRS may be construed as a minimum granularity of preventing a corresponding communication action, on the foregoing channel, of a device other than the first device in the network device. That is, the UE may transmit multiple SRSs according to a need.

Optionally, the receiving unit 73 may be configured to receive, in an uplink subframe, the SRS sent by the UE.

In this way, the UE can transmit the SRS by using the subframe. For example, the last one or more OFDM symbols of the uplink subframe are used to transmit the SRS.

The receiving unit 73 may be configured to receive, in a downlink subframe, the SRS sent by the UE, where the downlink subframe is further used to transmit downlink data.

Optionally, a location occupied by the SRS in the downlink subframe may be configured by the first device. For example, a location of an OFDM symbol occupied by the SRS in the downlink subframe may be configured by the first device. That is, the location of the OFDM symbol occupied by the SRS in the downlink subframe is changeable. In this way, the location of the OFDM symbol occupied by the SRS in the downlink subframe may be adjusted according to a different case.

In this implementation manner, the UE may use the downlink subframe to transmit the SRS to the network device. The downlink subframe may be a hybrid subframe. For example, the downlink data is transmitted in a previous OFDM symbol in the downlink subframe, and the last one or more OFDM symbols in the downlink subframe are used by the UE to transmit the SRS to the network device. In addition, it should be noted that, an SRS transmission location in the downlink subframe is adjustable. That is, the UE may transmit the SRS in a different location of the downlink subframe according to a different case.

In this embodiment, multiple optional implementation manners are added based on the embodiment shown in FIG. 6, and in each optional implementation manner, UE can be prevented from suffering an interference jitter phenomenon. In addition, the implementation manners in this embodiment may be applied to the embodiment shown in FIG. 6.

Figure 9:
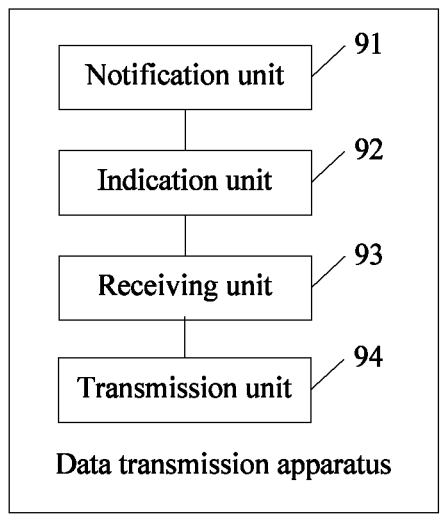
FIG. 9 is a schematic structural diagram of another data transmission apparatus according to an embodiment of the present invention.

Referring to FIG. 9, FIG. 9 is a schematic structural diagram of another data transmission apparatus according to an embodiment of the present invention. The apparatus may be applied to a first device. That is, the first device, for example, the first device described in the foregoing method embodiments, may include the apparatus. As shown in FIG. 9, the apparatus includes: a notification unit 91, an indication unit 92, a receiving unit 93, and a transmission unit 94.

The notification unit 91 is configured to receive a notification message that is sent by the UE and is used to indicate that the UE is suffering an HTP.

The sending unit 92 is configured to send, to the UE according to the notification message, a feedback request that is used to instruct to feed back channel indication data to a network device, where the channel indication data is used to indicate that a channel is occupied by the first device within a time that corresponds to the channel indication data, and the network device includes at least the first device.

The receiving unit 93 is configured to receive the channel indication data sent by the UE.

The transmission unit 94 is configured to perform, within the time that corresponds to the channel indication data, data transmission with the UE by using the channel.

By means of the foregoing apparatus, when UE is suffering an HTP, another network device can be prevented in time from transmitting data to the UE, so that the HTP that the UE is currently suffering can be resolved.

Optionally, the channel indication data may include a preset SRS. The SRS may include a preset SRS pattern, or the SRS may include a combination of multiple SRS patterns. The SRS pattern is used to indicate that the channel is occupied by the first device within a time that corresponds to the SRS pattern. That is, after receiving the SRS, the first device knows that no other network device uses the foregoing channel within the time that corresponds to the SRS, so that the first device may not sound the channel, but to transmit the data to the UE within the time. In addition, after receiving the SRS, a network device other than the first device in the network device knows that the foregoing channel is occupied by another device within the time that corresponds to the SRS, so as to forbid a communication action on the channel within the time.

Optionally, the SRS pattern may be an SRS pattern whose energy exceeds a preset energy value. For example: the SRS pattern may be a combination of multiple SRS patterns. That is, the UE is allowed to simultaneously use multiple SRS patterns. In this way, when a network device detects that a parametric value of the SRS pattern exceeds the preset energy value, the network device forbids a communication action on the channel within the time. Alternatively, when detecting that a parametric value of the SRS pattern exceeds the preset energy value, the first device may transmit the data to the UE within the time.

Certainly, in some scenarios, the SRS pattern may not be reflected on energy, but the network device may directly identify the SRS pattern.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM entity, where a time that corresponds to the SRS is configured by the OAM entity.

It should be noted that the SRS has a new interpretation in this embodiment and is different from an existing SRS. The corresponding time is configured during generation of the SRS. The time that corresponds to the SRS may be construed as a minimum granularity of preventing a corresponding communication action, on the foregoing channel, of a device other than the first device in the network device. That is, the UE may transmit multiple SRSs according to a need.

Optionally, the receiving unit 93 may be configured to receive, in an uplink subframe, the SRS sent by the UE.

In this way, the UE can transmit the SRS by using the subframe. For example, the last one or more OFDM symbols of the uplink subframe are used to transmit the SRS.

The receiving unit 93 may be configured to receive, in a downlink subframe, the SRS sent by the UE, where the downlink subframe is further used to transmit downlink data.

Optionally, a location occupied by the SRS in the downlink subframe may be configured by the first device. In this implementation manner, the UE may use the downlink subframe to transmit the SRS to the network device. The downlink subframe may be a hybrid subframe. For example, the downlink data is transmitted in a previous OFDM symbol in the downlink subframe, and the last one or more OFDM symbols in the downlink subframe are used by the UE to transmit the SRS to the network device. In addition, it should be noted that, an SRS transmission location in the downlink subframe is adjustable. That is, the UE may transmit the SRS in a different location of the downlink subframe according to a different case.

In this embodiment, multiple optional implementation manners are added based on the embodiment shown in FIG. 6, and in each optional implementation manner, UE can be prevented from suffering an interference jitter phenomenon. In addition, the implementation manners in this embodiment may be applied to the embodiment shown in FIG. 6.

Figure 10:
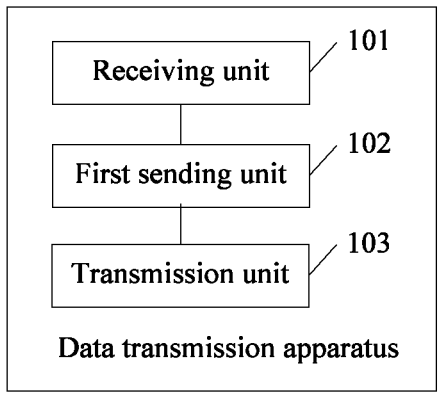
FIG. 10 is a schematic structural diagram of UE according to an embodiment of the present invention.

Referring to FIG. 10, FIG. 10 is a schematic structural diagram of UE according to an embodiment of the present invention. As shown in FIG. 10, the UE includes: a receiving unit 101, a first sending unit 102, and a transmission unit 103.

The receiving unit 101 is configured to receive a feedback request that is sent by a first device and is used to instruct to feed back channel indication data to a network device, where the channel indication data is used to indicate that a channel is occupied by the first device within a time that corresponds to the channel indication data, and the network device includes at least the first device.

The first sending unit 102 is configured to send the channel indication data to the network device.

The transmission unit 103 is configured to perform, within the time that corresponds to the channel indication data, data transmission with the first device by using the channel.

Figure 11:
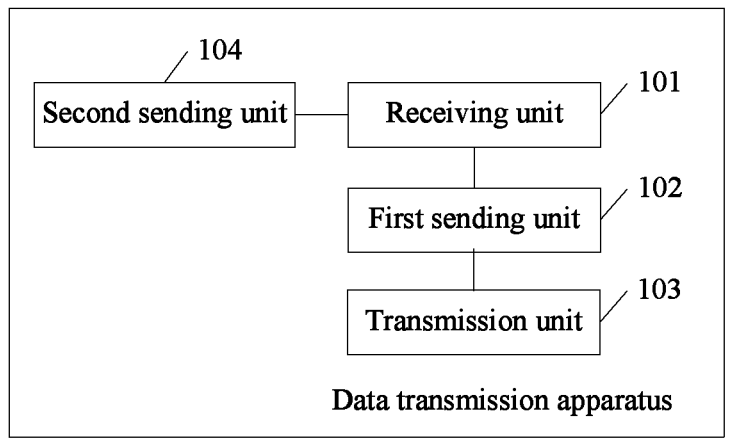
FIG. 11 is a schematic structural diagram of another UE according to an embodiment of the present invention.

Optionally, as shown in FIG. 11, the UE may further include: a second sending unit 104, configured to send signal information of first cell and signal information of second cell to the first device, where the signal information of first cell is cell signal information that is obtained by monitoring on the first device, and the second signal information is cell signal information that is obtained by monitoring on a second device included in the network device, so that the first device sends the feedback request when the first device determines that a difference between the signal information of first cell and the signal information of second cell is less than or equal to a preset threshold.

In this way, when determining that the difference between the signal information of first cell and the signal information of second cell is less than or equal to the preset threshold, the first device may send the feedback request.

Optionally, the first sending unit 102 may be configured to: before the UE transmits data to the first device, send the channel indication data to the network device.

In this way, the UE can be prevented in advance from suffering an HTP.

Figure 12:
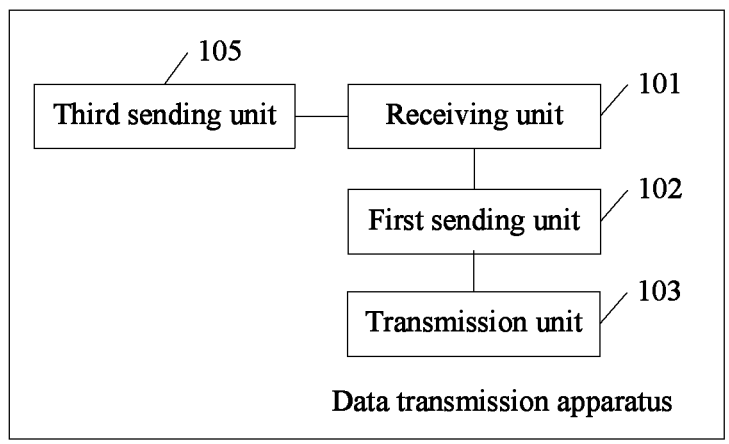
FIG. 12 is a schematic structural diagram of another UE according to an embodiment of the present invention.

Optionally, as shown in FIG. 12, the UE may further include: a third sending unit 105, configured to send, to the first device, a notification message that is used to indicate that the UE is suffering an HTP, so that the first device sends the feedback request according to the notification message.

The notification message may be sent when the UE is suffering the HTP.

In this implementation manner, the UE can be prevented in time from suffering the HTP.

Optionally, the channel indication data may include a preset SRS. The SRS may include a preset SRS pattern, or the SRS may include a combination of multiple SRS patterns.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM entity, where a time that corresponds to the SRS is configured by the OAM entity.

Optionally, the first sending unit 102 may be configured to send, in an uplink subframe, the SRS to the network device; or the first sending unit 102 may be configured to send, in a downlink subframe, the SRS to the network device, where the downlink subframe is further used to transmit downlink data.

Optionally, a location occupied by the SRS in the downlink subframe may be configured by the first device.

In this implementation manner, the UE may transmit the SRS in the uplink subframe, or the UE may transmit the SRS in the downlink subframe. The downlink subframe may be a hybrid subframe.

In this embodiment, the UE receives a feedback request that is sent by a first device and is used to instruct to feed back channel indication data to a network device. The channel indication data is used to indicate that a channel is occupied by the first device within a time that corresponds to the channel indication data. The network device includes at least the first device. The UE sends the channel indication data to the network device. The UE performs, within the time that corresponds to the channel indication data, data transmission with the first device by using the channel. In this way, UE can be prevented from suffering an interference jitter phenomenon.

Figure 13:
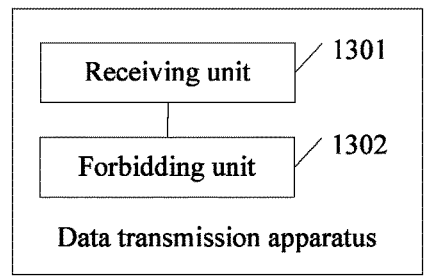
FIG. 13 is a schematic structural diagram of another data transmission apparatus according to an embodiment of the present invention.

Referring to FIG. 13, FIG. 13 is a schematic structural diagram of another data transmission apparatus according to an embodiment of the present invention. The apparatus may be applied to a second device. That is, the second device may include the foregoing apparatus. The second device may be the second device described in the foregoing method embodiments. As shown in FIG. 13, the apparatus includes a receiving unit 1301 and a forbidding unit 1302.

The receiving unit 1301 is configured to receive channel indication data sent by user equipment (UE), where the channel indication data is used to indicate that a channel is occupied by a first device within a time that corresponds to the channel indication data, the network device includes at least the second device and the first device, and the first device instructs the UE to send the channel indication data.

Optionally, the first device may instruct the UE to send the channel indication data to the network device. For a specific implementation process, refer to the descriptions in the foregoing embodiments.

The forbidding unit 1302 is configured to forbid a communication action on the channel within the time that corresponds to the channel indication data.

After the forbidding unit 1302 receives the channel indication data, it is known that the foregoing channel is occupied by the first device within the time that corresponds to the channel indication data, so that the second device forbids the communication action on the channel within the time.

Optionally, the forbidding unit 1302 may be configured to forbid use of the channel within the time that corresponds to the channel indication data; and/or the forbidding unit 1302 may be configured to forbid sensing of the channel within the time that corresponds to the channel indication data; and/or the forbidding unit 1302 may be configured to forbid sounding of the channel within the time that corresponds to the channel indication data.

By means of the foregoing apparatus, the second device can be forbidden from sensing, sounding, and/or using the foregoing information within the time that corresponds to the indication channel data. In this way, when the first device performs data transmission with the UE within the time that corresponds to the indication channel data, the UE does not suffer an HTP.

Optionally, the channel indication data may include a preset SRS. The SRS may include a preset SRS pattern, or the SRS may include a combination of multiple SRS patterns. The SRS pattern is used to indicate that the channel is occupied by the first device within a time that corresponds to the SRS pattern. That is, after receiving the SRS, the first device knows that no other network device uses the foregoing channel within the time that corresponds to the SRS, so that the first device may not sound the channel, but to transmit the data to the UE within the time. In addition, after receiving the SRS, the second device knows that the foregoing channel is occupied by another device within the time that corresponds to the SRS, so as to forbid a communication action on the channel within the time.

Optionally, the SRS pattern may be an SRS pattern whose energy exceeds a preset energy value. For example: the SRS pattern may be a combination of multiple SRS patterns. That is, the UE is allowed to simultaneously use multiple SRS patterns. In this way, when the second device detects that a parametric value of the SRS pattern exceeds the preset energy value, the second device forbids a communication action on the channel within the time. Alternatively, when detecting that a parametric value of the SRS pattern exceeds the preset energy value, the first device may transmit the data to the UE within the time.

Certainly, in some scenarios, the SRS pattern may not be reflected on energy, but the network device may directly identify the SRS pattern.

Optionally, the SRS may include: an SRS that is generated by means of pre-negotiation between devices included in the network device, where a time that corresponds to the SRS is generated by means of the pre-negotiation between the devices included in the network device; or an SRS configured by an OAM entity, where a time that corresponds to the SRS is configured by the OAM entity.

It should be noted that the SRS has a new interpretation in this embodiment and is different from an existing SRS. The corresponding time is configured during generation of the SRS. The time that corresponds to the SRS may be construed as a minimum granularity of preventing a corresponding communication action, on the foregoing channel, of a device other than the first device in the network device. That is, the UE may transmit multiple SRSs according to a need.

Optionally, the receiving unit 1302 may be configured to receive, in an uplink subframe, the SRS sent by the UE.

In this way, the UE can transmit the SRS by using the subframe. For example, the last one or more OFDM symbols of the uplink subframe are used to transmit the SRS.

Optionally, the receiving unit 1302 may be configured to receive, in a downlink subframe, the SRS sent by the UE, where the downlink subframe is further used to transmit downlink data.

Optionally, a location occupied by the SRS in the downlink subframe may be configured by the first device.

In this implementation manner, the UE may use the downlink subframe to transmit the SRS to the network device. The downlink subframe may be a hybrid subframe. For example, the downlink data is transmitted in a previous OFDM symbol in the downlink subframe, and the last one or more OFDM symbols in the downlink subframe are used by the UE to transmit the SRS to the network device.

In this embodiment, a second device receives channel indication data sent by user equipment (UE). The channel indication data is used to indicate that a channel is occupied by a first device within a time that corresponds to the channel indication data. The network device includes at least the second device and the first device, and the first device instructs the UE to send the channel indication data. The second device forbids a communication action on the channel within the time that corresponds to the channel indication data. In this way, UE can be prevented from suffering an interference jitter phenomenon.

Figure 14:
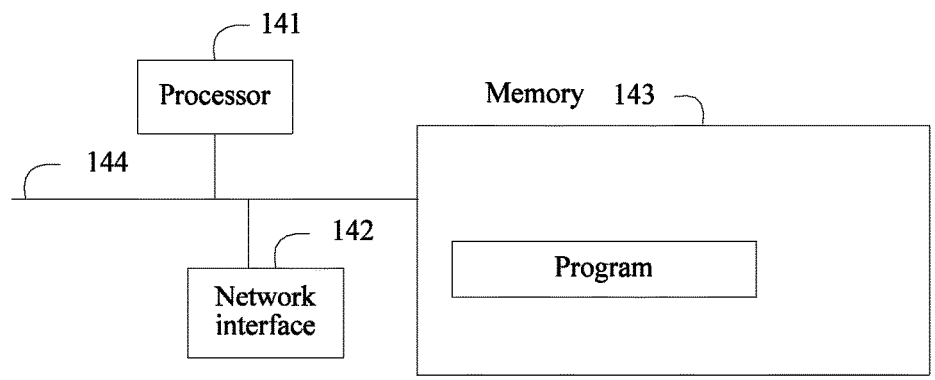
FIG. 14 is a schematic structural diagram of another data transmission apparatus according to an embodiment of the present invention.

Referring to FIG. 14, FIG. 14 is a schematic structural diagram of another data transmission apparatus according to an embodiment of the present invention. The apparatus may be applied to a first device. As shown in FIG. 14, the apparatus may include: a processor 141, a network interface 142, a memory 143, and a communications bus 144. The communications bus 144 is configured to implement connection communication among the processor 141, the network interface 142, and the memory 143. The processor 141 is configured to execute a program stored in the memory 143, where the program includes: sending, to UE, a feedback request that is used to instruct to feed back channel indication data to a network device, where the channel indication data is used to indicate that a channel is occupied by the first device within a time that corresponds to the channel indication data, and the network device includes at least the first device; receiving the channel indication data sent by the UE; and performing, within the time that corresponds to the channel indication data, data transmission with the UE by using the channel.

Optionally, the program executed by the processor 141 may further include: determining whether the UE is suspected UE, and if yes, performing the step of sending, to user equipment (UE), a feedback request that is used to instruct to feed back channel indication data to a network device, where the suspected UE includes UE that possibly suffers a hidden terminal problem (HTP).

Optionally, the program that is executed by the processor 141 to determine whether the UE suffers the HTP may include: receiving signal information of first cell and signal information of second cell that are uploaded by the UE, where the signal information of first cell is cell signal information that is obtained by the UE by monitoring on the first device, and the second signal information is cell signal information that is obtained by the UE by monitoring on a second device included in the network device; and determining whether a difference between the signal information of first cell and the signal information of second cell is less than or equal to a preset threshold; and if yes, determining that the UE is suspected UE, or if not, determining that the UE is not suspected UE.

Optionally, the program that is executed by the processor 141 to receive the channel indication data sent by the UE includes: before the first device transmits data to the UE, receiving the channel indication data sent by the UE.

Optionally, the program executed by the processor 141 further includes: receiving a notification message that is sent by the UE and is used to indicate that the UE is suffering an HTP; and the program that is executed by the processor to send, to the UE, the feedback request that is used to instruct to feed back the channel indication data to the network device includes: sending, to the UE according to the notification message, the feedback request that is used to instruct to feed back the channel indication data to the network device.

Optionally, the channel indication data includes a preset sounding reference signal (SRS), where the SRS includes a preset SRS pattern, or the SRS includes a combination of multiple SRS patterns.

Optionally, the SRS may include: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

Optionally, the program that is executed by the processor 141 to receive the channel indication data sent by the UE includes: receiving, in an uplink subframe, the SRS sent by the UE; or receiving, in a downlink subframe, the SRS sent by the UE, where the downlink subframe is further used to transmit downlink data, and a location occupied by the SRS in the downlink subframe is configured by the first device.

In this embodiment, a first device sends, to user equipment (UE), a feedback request that is used to instruct to feed back channel indication data to a network device. The channel indication data is used to indicate that a channel is occupied by the first device within a time that corresponds to the channel indication data. The network device includes at least the first device. The first device receives the channel indication data sent by the UE. The first device performs, within the time that corresponds to the channel indication data, data transmission with the UE by using the channel. In this way, when data transmission is performed between the first device and the UE within the foregoing time, the data transmission does not suffer interference from another network device. Therefore, the UE does not suffer an interference jitter phenomenon.

Figure 15:
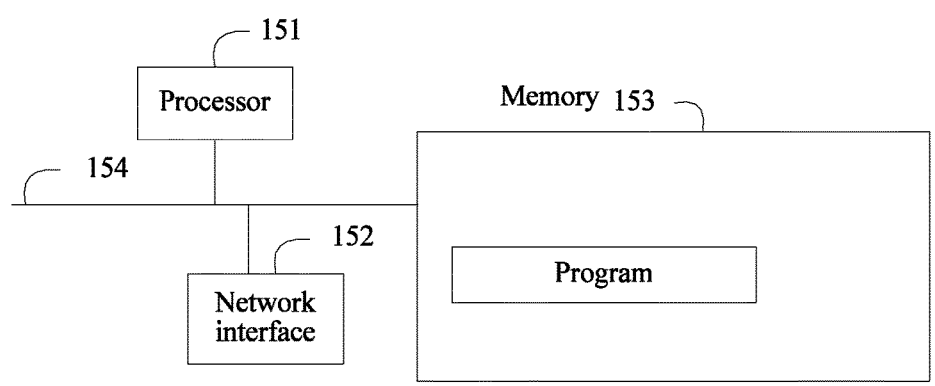
FIG. 15 is a schematic structural diagram of another UE according to an embodiment of the present invention.

Referring to FIG. 15, FIG. 15 is a schematic structural diagram of another UE according to an embodiment of the present invention. As shown in FIG. 15, the UE includes: a processor 151, a network interface 152, a memory 153, and a communications bus 154. The communications bus 154 is configured to implement connection communication among the processor 151, the network interface 152, and the memory 153. The processor 151 is configured to execute a program stored in the memory 153, where the program includes: receiving a feedback request that is sent by a first device and is used to instruct to feed back channel indication data to a network device, where the channel indication data is used to indicate that a channel is occupied by the first device within a time that corresponds to the channel indication data, and the network device includes at least the first device; sending the channel indication data to the network device; and performing, within the time that corresponds to the channel indication data, data transmission with the first device by using the channel.

Optionally, the program executed by the processor 151 may further include: sending signal information of first cell and signal information of second cell to the first device, where the signal information of first cell is cell signal information that is obtained by monitoring on the first device, and the second signal information is cell signal information that is obtained by monitoring on a second device included in the network device, so that the first device sends the feedback request when the first device determines that a difference between the signal information of first cell and the signal information of second cell is less than or equal to a preset threshold.

Optionally, the program that is executed by the processor 151 to send the channel indication data to the network device may include: before the UE transmits data to the first device, sending the channel indication data to the network device.

Optionally, the program executed by the processor 151 may further include: sending, to the first device, a notification message that is used to indicate that the UE is suffering an HTP, so that the first device sends the feedback request according to the notification message.

Optionally, the channel indication data includes a preset sounding reference signal (SRS), where the SRS includes a preset SRS pattern, or the SRS includes a combination of multiple SRS patterns.

Optionally, the SRS includes: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

Optionally, the program that is executed by the processor 151 to send the channel indication data to the network device may include: sending, in an uplink subframe, the SRS to the network device; or sending, in a downlink subframe, the SRS to the network device, where the downlink subframe is further used to transmit downlink data, and a location occupied by the SRS in the downlink subframe is configured by the first device.

In this embodiment, the UE receives a feedback request that is sent by a first device and is used to instruct to feed back channel indication data to a network device. The channel indication data is used to indicate that a channel is occupied by the first device within a time that corresponds to the channel indication data. The network device includes at least the first device. The UE sends the channel indication data to the network device. The UE performs, within the time that corresponds to the channel indication data, data transmission with the first device by using the channel. In this way, UE can be prevented from suffering an interference jitter phenomenon.

Figure 16:
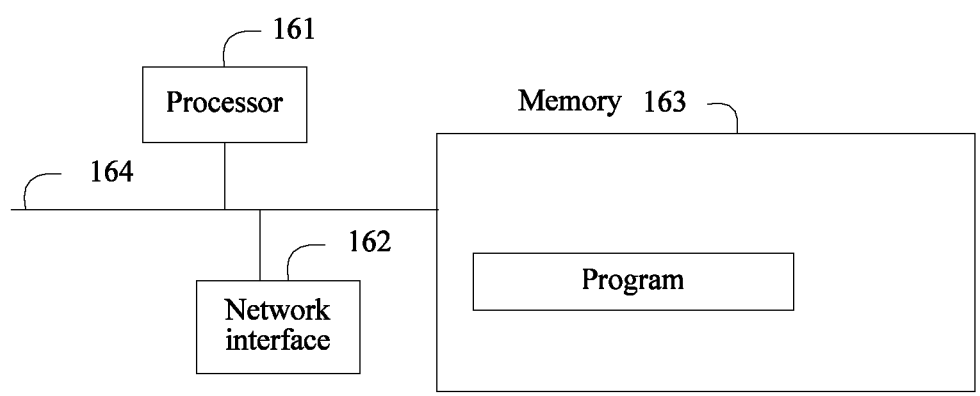
FIG. 16 is a schematic structural diagram of another data transmission apparatus according to an embodiment of the present invention.

Referring to FIG. 16, FIG. 16 is a schematic structural diagram of another data transmission apparatus according to an embodiment of the present invention. The apparatus may be applied to a second device. As shown in FIG. 16, the apparatus includes: a processor 161, a network interface 162, a memory 163, and a communications bus 164. The communications bus 164 is configured to implement connection communication among the processor 161, the network interface 162, and the memory 163. The processor 161 is configured to execute a program stored in the memory 163, where the program includes: receiving channel indication data sent by user equipment (UE), where the channel indication data is used to indicate that a channel is occupied by a first device within a time that corresponds to the channel indication data, the network device includes at least the second device and the first device, and the first device instructs the UE to send the channel indication data; and forbidding a communication action on the channel within the time that corresponds to the channel indication data.

Optionally, the program that is executed by the processor 161 to forbid the communication action on the channel within the time that corresponds to the channel indication data may include: forbidding use of the channel within the time that corresponds to the channel indication data; and/or forbidding sensing of the channel within the time that corresponds to the channel indication data; and/or forbidding sounding of the channel within the time that corresponds to the channel indication data.

Optionally, the channel indication data includes a preset sounding reference signal (SRS), where the SRS includes a preset SRS pattern, or the SRS includes a combination of multiple SRS patterns.

Optionally, the SRS may include: an SRS that is generated by means of pre-negotiation between devices included in the network device, where a time that corresponds to the SRS is generated by means of the pre-negotiation between the devices included in the network device; or an SRS configured by an operation, administration and maintenance (OAM) entity, where a time that corresponds to the SRS is configured by the OAM entity.

Optionally, the program that is executed by the processor 161 to receive the channel indication data sent by the UE may include: receiving, in an uplink subframe, the SRS sent by the UE; or receiving, in a downlink subframe, the SRS sent by the UE, where the downlink subframe is further used to transmit downlink data, and a location occupied by the SRS in the downlink subframe is configured by the first device.

In this embodiment, a second device receives channel indication data sent by user equipment (UE). The channel indication data is used to indicate that a channel is occupied by a first device within a time that corresponds to the channel indication data. The network device includes at least the second device and the first device, and the first device instructs the UE to send the channel indication data. The second device forbids a communication action on the channel within the time that corresponds to the channel indication data. In this way, UE can be prevented from suffering an interference jitter phenomenon.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disc, an optical disc, a read-only memory (ROM), or a random access memory (RAM for short).

What are disclosed above are merely exemplary embodiments of the present invention, and certainly are not intended to limit the protection scope of the present invention. Therefore, equivalent variations made in accordance with the claims of the present invention shall fall within the scope of the present invention.

What is claimed is:

1. A method, comprising:
   receiving, by a first device, signal information of a first cell and signal information of a second cell that are uploaded by a user equipment (UE), wherein the UE monitors the first device to obtain the signal information of the first cell and the UE monitors a second device to obtain the signal information of the second cell;
   determining, by the first device, whether the UE is a suspected UE, based on whether the UE is experiencing a hidden terminal problem (HTP), wherein determining whether the UE is the suspected UE comprises determining, by the first device, whether a difference between the signal information of the first cell and the signal information of the second cell is less than or equal to a preset threshold, wherein the UE is the suspected UE when the difference is less than or equal to the preset threshold;
   sending, by the first device to the UE, when the UE is the suspected UE, a feedback request that instructs the UE to feed back channel indication data to a plurality of network devices, wherein the channel indication data indicates that a channel, which is occupied by the first device, remains occupied only by the first device within a time that corresponds to the channel indication data, and the plurality of network devices comprises the first device and the second device;
   receiving, by the first device, the channel indication data sent by the UE; and
   in response to the first device receiving the channel indication data, performing, by the first device, data transmission with the UE, using the channel within the time that corresponds to the channel indication data, without interference from the second device on the channel.

2. The method according to claim 1, further comprising:
   receiving, by the first device, a notification message that is sent by the UE, wherein the notification message indicates that the UE is experiencing an HTP; and
   wherein sending the feedback request comprises sending, by the first device to the UE, the feedback request that instructs the UE to feed back the channel indication data to the plurality of network devices, based upon the notification message.

3. The method according to claim 1, wherein the channel indication data comprises a preset sounding reference signal (SRS), wherein the preset SRS comprises: a preset SRS pattern, or a combination of multiple SRS patterns.

4. The method according to claim 1, wherein the channel indication data comprises a preset sounding reference signal (SRS) comprising:
   an SRS that is generated by means of pre-negotiation between devices of the plurality of network devices, wherein a time that corresponds to the SRS is generated by means of the pre-negotiation between the devices of the plurality of network devices; or an SRS configured by an operation, administration and maintenance (OAM) server, wherein a time that corresponds to the SRS is configured by the OAM server.

5. The method according to claim 1, wherein receiving, by the first device, the channel indication data sent by the UE, comprises:
receiving, by the first device in an uplink subframe, a sounding reference signal (SRS) sent by the UE; or
receiving, by the first device in a downlink subframe, the SRS sent by the UE, wherein downlink data is also transmitted in the downlink subframe, and a location occupied by the SRS in the downlink subframe is configured by the first device.

6. The method according to claim 1, wherein the signal information, relative to a cell that is the first cell or second cell, comprises a reference signal received power (RSRP), a reference signal received quality (RSRQ), or a received signal strength indicator (RSSI) of the cell.

7. A method, comprising:
sending, by a user equipment (UE), signal information of a first cell and signal information of a second cell to a first device, wherein the signal information of the first cell is cell signal information that is obtained by monitoring on the first device, and the signal information of the second cell is cell signal information that is obtained by monitoring on a second device comprised in a plurality of network devices;
receiving, by the UE after sending the signal information of the first cell and the signal information of the second cell, a feedback request that is sent by the first device, wherein the feedback request is sent by the first device when the first device determines that a difference between the signal information of the first cell and the signal information of the second cell is less than or equal to a preset threshold, wherein the feedback request instructs the UE to feed back channel indication data to the plurality of network devices, wherein the channel indication data indicates that a channel, which is occupied by the first device, remains occupied only by the first device within a time that corresponds to the channel indication data, and the plurality of network devices comprises the first device and the second device;
sending, by the UE, the channel indication data to the plurality of network devices; and
in response to the channel indication data that is sent to the plurality of network devices, performing, by the UE, data transmission with the first device using the channel within the time that corresponds to the channel indication data, without interference from the second device.

8. The method according to claim 7, further comprising:
before receiving the feedback request, sending, by the UE to the first device, a notification message that indicates that the UE is experiencing a hidden terminal problem (an HTP);
wherein the first device sends the feedback request based upon the notification message.

9. The method according to claim 7, wherein the channel indication data comprises a preset sounding reference signal (SRS), wherein the preset SRS comprises a preset SRS pattern, or a combination of multiple SRS patterns.

10. The method according to claim 7, wherein the channel indication data comprises a preset sounding reference signal (SRS) comprising:
an SRS that is generated by means of a pre-negotiation between devices of the plurality of network devices, wherein a time that corresponds to the SRS is generated by the means of the pre-negotiation between the devices of the plurality of network devices; or
an SRS configured by an operation, administration and maintenance (OAM) server, wherein a time that corresponds to the SRS is configured by the OAM server.

11. The method according to claim 7, wherein sending, by the UE, the channel indication data to the plurality of network devices comprises:
sending, by the UE in an uplink subframe, a sounding reference signal (SRS) to the plurality of network devices; or
sending, by the UE in a downlink subframe, the SRS to the plurality of network devices, wherein downlink data is also transmitted in the downlink subframe, and a location occupied by the SRS in the downlink subframe is configured by the first device.

12. The method according to claim 7, wherein the signal information, relative to a cell that is the first cell or second cell, comprises a reference signal received power (RSRP), a reference signal received quality (RSRQ), or a received signal strength indicator (RSSI) of the cell.

13. A data transmission method, comprising:
receiving, by a second device, channel indication data sent by a user equipment (UE) in response to a feedback request sent by a first device to the UE, wherein the channel indication data indicates that a channel, which is occupied by the first device, remain occupied by only the first device within a time that corresponds to the channel indication data; and
forbidding, by the second device, a communication action on the channel within the time that corresponds to the channel indication data;
wherein the UE is instructed by the first device in the feedback request sent by the first device, to send the channel indication data to a plurality of network devices, wherein the feedback request is sent by the first device when the first device determines that a difference between signal information of a first cell and signal information of a second cell is less than or equal to a preset threshold, the first device having received, from the UE, the signal information of the first cell and the signal information of the second cell, wherein the signal information of the first cell is cell signal information that is obtained by monitoring on the first device, and the signal information of the second cell is cell signal information that is obtained by monitoring on the second device; and
wherein the first device and the second device comprise the plurality of network devices.

14. The method according to claim 13, wherein forbidding the communication action comprises:
forbidding, by the second device, use of the channel within the time that corresponds to the channel indication data;
forbidding, by the second device, sensing of the channel within the time that corresponds to the channel indication data; or
forbidding, by the second device, sounding of the channel within the time that corresponds to the channel indication data.

15. The method according to claim 13, wherein the channel indication data comprises a preset sounding reference signal (SRS); and
wherein the preset SRS comprises a preset SRS pattern, or a combination of multiple SRS patterns.

16. The method according to claim 15, wherein receiving the channel indication data comprises:
- receiving, by the second device in an uplink subframe, the SRS sent by the UE; or
- receiving, by the second device in a downlink subframe, the SRS sent by the UE, wherein downlink data is also transmitted in the downlink subframe, and a location occupied by the SRS in the downlink subframe is configured by the first device.

17. The method according to claim 13, wherein the channel indication data comprises a preset sounding reference signal (SRS) comprising:
- an SRS that is generated by means of a pre-negotiation between devices of the plurality of network devices, wherein a time that corresponds to the SRS is generated by the means of the pre-negotiation between the devices of the plurality of network devices; or
- an SRS configured by an operation, administration and maintenance (OAM) server, wherein a time that corresponds to the SRS is configured by the OAM server.

* * * * *